(12) United States Patent
Alcaide Hernández et al.

(10) Patent No.: US 11,208,079 B2
(45) Date of Patent: Dec. 28, 2021

(54) TELESCOPIC WASHING DEVICE

(71) Applicant: Fico Transpar, S.A., Barcelona (ES)

(72) Inventors: Olallo Alcaide Hernández, Viladecavalls (ES); Robert López Galera, Viladecavalls (ES)

(73) Assignee: FICO TRANSPAR, S.A., Barcelona (ES)

( * ) Notice: Subject to any disclaimer, the term of this patent is extended or adjusted under 35 U.S.C. 154(b) by 0 days.

(21) Appl. No.: 16/879,373

(22) Filed: May 20, 2020

(65) Prior Publication Data

US 2020/0369244 A1 Nov. 26, 2020

(30) Foreign Application Priority Data

May 20, 2019 (EP) .................................. 19382400

(51) Int. Cl.
 *B60S 1/52* (2006.01)
 *B60S 1/44* (2006.01)
 *B60S 1/54* (2006.01)

(52) U.S. Cl.
 CPC . *B60S 1/44* (2013.01); *B60S 1/52* (2013.01); *B60S 1/542* (2013.01)

(58) Field of Classification Search
 CPC ................. B60S 1/52; B60S 1/56; B60S 1/04
 See application file for complete search history.

(56) References Cited

U.S. PATENT DOCUMENTS

| 3,667,081 A | 6/1972 | Burger |
| 6,905,078 B1 | 6/2005 | Gattuso et al. |
| 2018/0021792 A1* | 1/2018 | Lopez ........................ B05B 1/04 239/456 |

FOREIGN PATENT DOCUMENTS

| CA | 2364055 A1 * | 9/2000 | .............. B60S 1/603 |
| DE | 10104989 A1 | 8/2002 | |
| EP | 3318452 A1 | 5/2018 | |
| FR | 2704497 A1 | 11/1994 | |
| FR | 3005623 A1 | 11/2014 | |
| GB | 1332290 A | 10/1973 | |
| JP | 2006176028 A | 7/2006 | |
| WO | 0051745 A1 | 9/2000 | |
| WO | WO-2019192666 A1 * | 10/2019 | ................ B60S 1/40 |

OTHER PUBLICATIONS

Extended European Search Report for European Application No. 19382400.0; Date of Completion: Nov. 6, 2019; dated Nov. 22, 2019; 4 Pages.

* cited by examiner

*Primary Examiner* — Michael D Jennings
(74) *Attorney, Agent, or Firm* — Cantor Colburn LLP

(57) ABSTRACT

The telescopic washing device comprises first and second telescopic members operable along a first linear path between retracted extended positions parallel to telescopic member longitudinal axis Z; a wiper element coupled to the second telescopic member such that the wiper element is movable according to a second path lying on a plane XY perpendicular to the longitudinal axis Z; a second guiding area associated with first telescopic member or wiper element and according to second path; and a guiding element associated with the other of the first telescopic member or the wiper element to slide to the second guiding area as the first and second telescopic members move to each other. As pressurized fluid is supplied to the first telescopic member, the wiper element is at least rotated according to the second path.

20 Claims, 3 Drawing Sheets

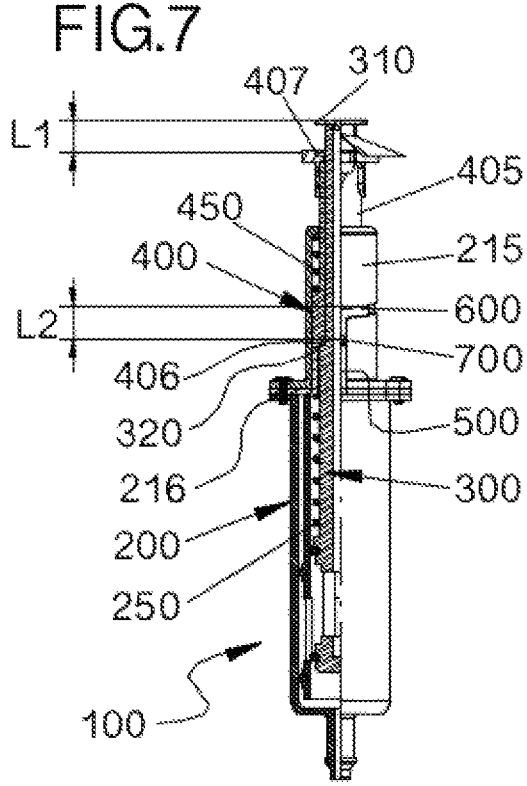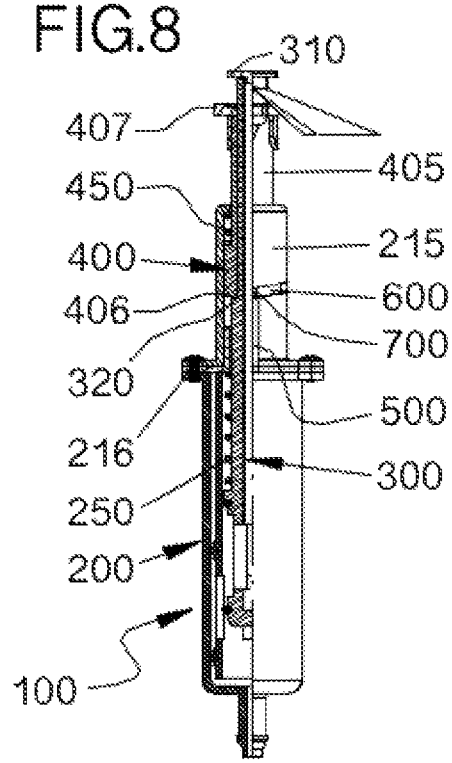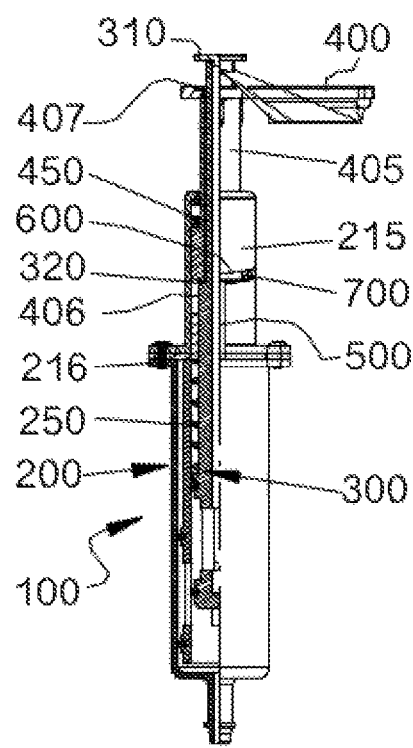

TELESCOPIC WASHING DEVICE

CROSS-REFERENCE TO RELATED APPLICATIONS

This application claims the benefit of European Application Serial No. 19382400.0 filed May 20, 2019, the disclosure of which is incorporated herein by reference in its entirety.

TECHNICAL FIELD

The present disclosure refers to telescopic washing devices, and more specifically to automotive telescopic washing devices adapted to clean an optical surface.

BACKGROUND

Telescopic devices for washing surfaces in motor vehicles are known in the art. For example, FR3005623 discloses a telescopic washing device comprising a body fixed to the motor vehicle and having at least one washing liquid inlet, a piston movable in the body fluidly connected thereto so as to move under the action of the pressure of the washing liquid, and a nozzle connected to the piston for spraying washing liquid. Such telescopic washing device further comprises a guide member connected to the body and adapted to guide the piston in a helical movement about a telescopic axis.

Also, document EP1163056 A1 discloses a headlamp washer system that comprises a chamber capable of fluid ingress and egress that, in turn, comprises a female helical member configured to engage with a male helical member. This causes a first movement which is a linear or axial movement and a second rotational movement, the movements being transmitted simultaneously to a wiper.

There is however a need for simple, yet efficient and cost-effective telescopic devices for cleaning surfaces for example in motor vehicles which at the same time are capable of being arranged in a position not protruding from a vehicle when not in use.

SUMMARY

A telescopic washing device is provided herein that meets the above need and also provides a number of relevant advantages. The present telescopic washing device is intended for washing a surface, for example an optical surface in a motor vehicle part. The present washing device is adapted to wipe a surface such as an optical surface of a part in a motor vehicle. The present washing device is also adapted to eject a fluid such as a washing liquid, a washing gas, a combination of washing liquids, a combination of washing gases, a combination of washing liquid (or liquids) and gas (or gases) etc. against a surface to be washed, flushed, rinsed, etc.

The present telescopic washing device comprises a first telescopic member and a second telescopic member. The first telescopic member is adapted for receiving pressurized fluid from a fluid source. For this purpose, at least one fluid inlet may be provided in the first telescopic member for receiving pressurized washing fluid from a fluid source.

The second telescopic member is arranged to be moved relative to the first telescopic member by the pressurized fluid according to a first path between a retracted position and an extended position. The first path is linear and parallel to a longitudinal axis of the first and second telescopic members.

A wiper element is coupled to the second telescopic member such that the wiper element can be moved with the second telescopic member according to a second path. The wiper element may be arranged to be moved according to substantially the first path, thus with a component aligned or parallel to the longitudinal axis of the first and second telescopic members and a possible component perpendicular to the longitudinal axis. Preferably at least in one section between the retracted position and the extended position of the second telescopic member, a substantially longitudinal axis relative movement and/or a rotational relative movement between the wiper element and the second telescopic member is allowed. The second path is arranged lying on a plane substantially perpendicular to the longitudinal axis and preferably curved, thus with a component perpendicular to the longitudinal axis of the first and second telescopic members and a possible component parallel to the longitudinal axis. The component parallel to the longitudinal axis of the first and second telescopic members implies a longitudinal axis movement of the wiper element and the component perpendicular to the longitudinal axis implies a rotation of the wiper element substantially around the longitudinal axis.

In one example, the second path may, for example, be helical. In another example the second path is circular, and still in another example, the second path is circular and centered on the longitudinal axis. Within the meaning of the present disclosure, substantially perpendicular refers to perpendicular within some acceptable deviation within plus or minus ten degrees (±10°) from exactly perpendicular.

Within the meaning of the present disclosure, substantially perpendicular or parallel refers to a path that could have a small degree of curvature, that is, with a large radius of curvature. Also, within the meaning of the present disclosure, substantially perpendicular or parallel a deviation within plus or minus ten degrees (±10°) is acceptable.

The wiper element may comprise a wiper arm and a wiper blade. The wiper arm may be movably coupled to the second telescopic member. The wiper blade may be supported by the wiper arm substantially perpendicular to the longitudinal axis of the first and second telescopic members. In general, it is preferred that the wiper element is arranged substantially perpendicular to the longitudinal axis of the first and second telescopic members.

A second guiding area is associated with one of the first telescopic members or the wiper element and according to the second path. A guiding element is complementarily associated with the other of the first telescopic members or the wiper element configured to slide relative to the second guiding area as the first and second telescopic members move relative to each other. Thus, as pressurized fluid is supplied to the first telescopic member, the wiper element is at least rotated according to the second path.

A first guiding area, associated with one of the first telescopic member or the wiper element, may be arranged substantially extending according to the first path. The second guiding area extends from the first guiding area at an angle thereto. The guiding element is configured to slide relative to the first and second guiding areas. As pressurized fluid is supplied to the first telescopic member, the wiper element is first moved linearly according to the first path and then at least rotated according to the second path.

The first path is preferably substantially vertical, parallel to the longitudinal axis of the first and second telescopic members. In one example, the first guiding area extends parallel to the longitudinal axis, that is, parallel to the substantially linear movement of the second telescopic member between the retracted and extended positions. The second guiding area has a first section adjacent the first guiding area and is arranged at an angle thereto. In general, the angle between the first guiding area and the second guiding area may substantially ranges from 90° to 270°, such as for example substantially greater than 90°, e.g., ranging from 91° to 100°, or ranging from 269° to 260°. It is preferred that the transition from the first guiding area and the second guiding area is smooth and progressive.

The first guiding area and the second guiding area may be configured as at least one selected from grooves, recesses or slots. The first and second guiding areas may be formed extending at least partially through at least one of the first telescopic member or the wiper element, that is, the grooves, recesses or slots may be through grooves, through recesses or through slots or they may only extend a specific amount across the thickness of at least one of the first telescopic member or the wiper element.

A guiding element is complementarily associated with the other of the first telescopic member or the wiper element. The guiding element is configured, for example in the form of a pin, to slide relative to the first and second guiding areas as the first and second telescopic members move relative to each other. The guiding element may be associated with the wiper element. The guiding element may be configured as a pin projecting into the grooves, recesses or slots of the first and second guiding areas.

In use, as pressurized fluid is supplied to the first telescopic member from the fluid source, the second telescopic member and thus the wiper element are linearly driven according to the first path from the retracted position towards the extended position. When the second telescopic member has been displaced a given distance, then the wiper element is rotated according to the second path. When a given position of the second telescopic member is reached, the washing fluid flows out through a nozzle formed in the second telescopic member which will described below.

Thus, the present telescopic washing device has a wiper element capable of performing two different types of movement, that is, a first linear or axial movement along the above mentioned longitudinal axis between the retracted and the extended positions, and a second radial or rotational, e.g. helical, movement around the longitudinal axis. The combination of the washing fluid being ejected and the combined linear and rotational movement of the wiper element allows any the desired surface to be washed, cleaned, wiped, and dried efficiently while, at same time, allowing the parts of the telescopic washing device to be in a position not protruding from the vehicle when not in use, or without disturbing operation on the desired surface to be washed.

It may be preferred that first and second end of travel elements are formed in the second telescopic member so as to define a stroke of the wiper element along the above mentioned first path. In one example, a first end of travel element may be in the form of an upper cover that removably fits into an upper end of the second telescopic member projecting radially outwards the outer perimeter of the second telescopic member. In further examples, the first end of travel element may be formed integral with the second telescopic member. The second end of travel element may be in the form of a radially protruding element formed in or attached to a lower end of the second telescopic member. The lower end of the second telescopic member is arranged at a distance from the first end of travel element, the distance corresponding to a distance of the movement of the second telescopic member without pushing the wiper element plus the length of the first and second guiding area associated with the longitudinal axis.

In one example, the wiper element comprises a wiper body surrounding the second telescopic member and extending between a first end intended to abut the first end of travel element when the second telescopic member is at least in the retracted position and a second end intended to abut the second end of travel element when the second telescopic member is at least in the extended position.

The present telescopic washing device may further comprise biasing means, for example in the form of a compression spring, for returning the second telescopic member back into the retracted position when a pressure from the pressurized fluid is below a predetermined value.

In one particular example, the first guiding area and the second guiding area may be formed in a fixed separate part external to the first telescopic member. Such fixed separate part has no relative movement with respect to the first telescopic member but may be in contact with the first telescopic member or not, as required.

In some examples the guiding element may be associated with the wiper element and the first and second guiding areas may be associated with first telescopic member. In other examples, the guiding element may be associated with the first telescopic member and the first and second guiding areas may be associated with wiper element.

A guide cover may be provided. The guide cover may be formed integral with the first telescopic member or it may be a separate piece attached to an upper end of the first telescopic member. The guide cover, if provided, includes the above mentioned first and second guiding areas. A chamber may be defined between the guide cover and the wiper body suitable for receiving a spring intended to be compressed as the wiper moves in one direction, e.g. upwards, and to be extended as the wiper moves in an opposite direction, e.g. downwards. This may help to move the wiper into a rest position.

At least one nozzle may be provided in the second telescopic member suitable for ejecting a fluid as disclosed in EP3318452 filed in the name of the same applicant. In a particular example, the nozzle is positioned at an upper end of the second telescopic member, arranged to supply fluid in a substantially downward direction. The second telescopic member is arranged such that no fluid is discharged just after the second telescopic member starts moving, but when a given distance has been travelled by the second telescopic member in a way that the nozzle protrudes from the wiper arm, washing fluid starts being discharged from the nozzle. Washing fluid discharge is combined with rotation of the wiper arm and thus that of the wiper blade crossing the direction of washing fluid being discharged. After washing and wiping operations have been completed, the wiper element is then caused to return back downward to its initial position by the above mentioned biasing means, i.e. compression spring, at the same time as retraction of the second telescopic member occurs and the nozzle stops discharging washing fluid.

With the present telescopic washing device, larger areas can be cleaned, wiped, and dried and solid particles be removed more efficiently using a reduced amount of washing fluid. Also, the present washing device can be arranged in a position not protruding from a vehicle when not in use. A simple, efficient and cost-effective telescopic washing device is obtained.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 7 is a sectional perspective view of the telescopic washing device with the wiper element in a first operating position;

FIG. 8 is a sectional perspective view of the telescopic washing device with the wiper element in a second operating position; and FIG. 9 is a sectional perspective view of the telescopic washing device with the wiper element in a third operating position.

DETAILED DESCRIPTION

Figure 1:
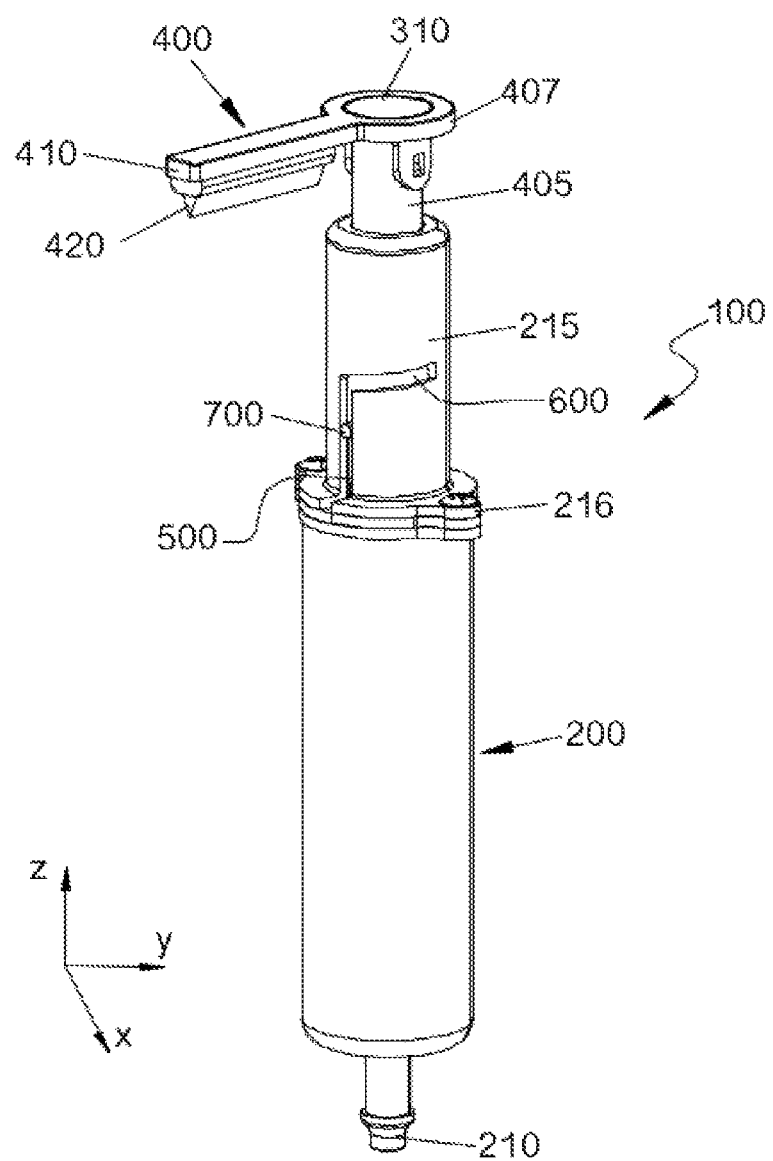
FIG. 1 illustrates one non-limiting, exemplary, embodiment of a telescopic washing device in a retracted or lower position (rest position)

A non-limiting, exemplary, embodiment of the present telescopic washing device is shown in the figures, and indicated as a whole by reference numeral 100. In the example shown, the telescopic washing device 100 is configured for cleaning or washing an optical surface S of a motor vehicle part by the combined action of ejecting a washing fluid, in this example as a washing liquid such as water, and a wiping action of a wiper on the optical surface S. One example of an optical surface S has been diagrammatically depicted in FIG. 2.

Referring to the figures, the telescopic washing device 100 comprises first and second telescopic members 200, 300, and a wiper element 400 that is coupled to the second telescopic member 300.

The first telescopic member 200 has a fluid inlet 210 that is located at a bottom end thereof. The fluid inlet 210 is adapted for receiving pressurized washing fluid from a fluid source, not shown in the drawing. A guide cover 215 is attached to an upper end 216 of the first telescopic member 200.

The second telescopic member 300 is arranged telescopically to the first telescopic member 200 such that the second telescopic member 300 can be displaced relative to the first telescopic member 200 by the action of pressurized fluid flowing therethrough according to a first path between a retracted or lower position and an extended or upper position. The first path is linear along or parallel to a longitudinal axis Z of the first and second telescopic members 200, 300.

First and second end of travel elements 310, 320 are formed in the second telescopic member 300. The first end of travel element in the example shown is in the form of an upper cover 310 that removably fits into an upper end of the second telescopic member 300. The upper cover 310 projects radially outwards away from the outer perimeter of the second telescopic member 300 so as to act as a pusher when contacting an upper end 407 of a wiper element 400 provided. The second end of travel element 320 is in the form of a radially protruding element formed in a lower end of the second telescopic member 300 at a distance L from the first end of travel element 310 that will be defined below. The second end of travel element 320 also acts as another pusher when contacting a lower end 406 of the wiper element 400.

FIGS. 7, 8 and 9 show the telescopic washing device 100 with the wiper element 400 in different operating positions. In particular, FIG. 7 shows the telescopic washing device 100 with the second telescopic member 300 starts driving the wiper element 400 while pressurized washing fluid is being ejected. FIGS. 8 and 9 show different positions of the second telescopic member 300.

A compression spring 450 is provided in a chamber defined between the guide cover 215 and the wiper body 405 as shown in FIGS. 7-9. The compression spring 450 is arranged to be compressed as the wiper element 400 moves upwards and to be extended as the wiper element 400 moves downwards so as to help to move the wiper element 400 into a rest position as shown in FIG. 7.

A nozzle, not shown, is provided at one upper end of the second telescopic member 300 for ejecting the pressurized washing fluid from the fluid source that flows through the first and second telescopic members 200, 300. The nozzle is configured to supply the washing fluid in a substantially downward direction towards the optical surface S.

The first path is defined by a first guiding area 500 that extends substantially parallel to the longitudinal axis Z, that is, substantially parallel to the linear movement of the second telescopic member between the retracted and extended positions. A second path is defined by a second guiding area 600. The second path is curved, in particular, helical, and is arranged lying on a plane XY substantially perpendicular to the longitudinal axis Z.

In the example shown in the figures, the first and second guiding areas 500, 600 are formed in the guide cover 215 that is attached to the first telescopic member 200. The second guiding area 600 has a first section extending at an angle to the first guiding area 500 that is greater than 90°, such as for example ranging from 91° to 100°. The first and second guiding areas 500, 600 in the example shown are configured as through grooves, that is, they are formed extending through the entire width dimension of the guide cover 215.

As stated above, in the example illustrated in the drawing, the wiper element 400 is coupled to the second telescopic member 300. The wiper element 400 can be thus moved according to the above mentioned first path and also according to the second path.

The wiper element 400 comprises a wiper arm 410, a wiper blade 420, and a wiper body 405. The wiper arm 410 extends from the wiper body 405. The wiper body 405 is movably coupled to the second telescopic member 300 as shown in the drawing. The wiper blade 420 is supported by the wiper arm 410 substantially perpendicular to the longitudinal axis Z of the first and second telescopic members 200, 300. One or more of the wiper blade 420 and the wiper arm 410 is made from an elastic material so as to accommodate irregularities or curvatures in the optical surface S of the part to be washed or even to overcome a vertical component in the second path.

The wiper body 405 is arranged surrounding the second telescopic member 300 and extends between a first, lower end 406 that is adapted to abut the second end of travel element 320 of the second telescopic member 300 and a second, upper end 407 that is adapted to abut the first end of travel element 310 of the second telescopic member 300.

A stroke L of the second telescopic member 300 is the sum of a stroke L1 of the second telescopic member 300 without abutting the wiper element 400 and a stroke L2 of the second telescoping member 300 driving the wiper element 400 along the first and second paths. The stroke of the movement of the wiper element 400 thus extends between the first and second guiding areas 500, 600.

A guiding element or pin 700 is formed in the wiper element 400 protruding therefrom. In operation, the guiding element or pin 700 moves with the wiper element 400 as the second telescopic member 300 moves. The pin 700 is sized and shaped to slide within the grooves of the first and second guiding areas 500, 600 as the second telescopic member 300 moves.

The general operation of the present telescopic washing device 100 is as follows. The telescopic washing device 100 is arranged flush with the optical surface S to be washed or flush with the external surface of the vehicle that is, not protruding therefrom. As pressurized fluid is supplied from the fluid source into the fluid inlet 210 through the inside of the first telescopic member 200, the second telescopic member 300 is first moved linearly upwards along or parallel to the longitudinal axis Z according to the first path from the retracted position shown in FIG. 1 towards an intermediate extended position shown in FIG. 2. This causes the second telescopic member 300 to protrude outwards away from the optical surface S to be washed.

Figure 2:
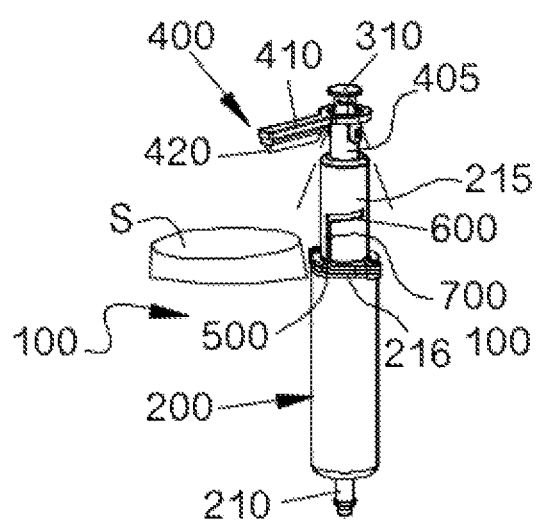
FIG. 2 illustrates the telescopic washing device in a position in which the second telescopic member has been displaced linearly relative to the first telescopic member along a first path to an extent that pressurized washing fluid is ejected.
Figure 3:
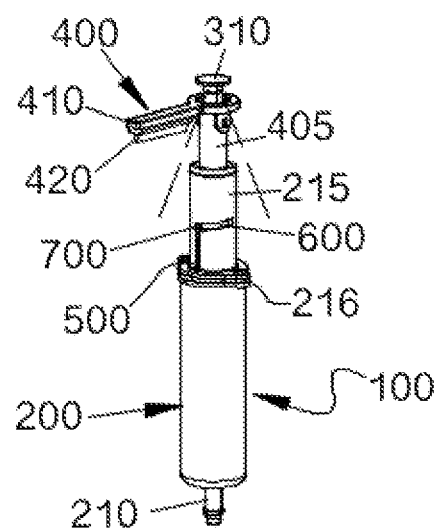
FIG. 3 illustrates the telescopic washing device in a position in which the wiper element starts rotating according to a second path.
Figure 4:
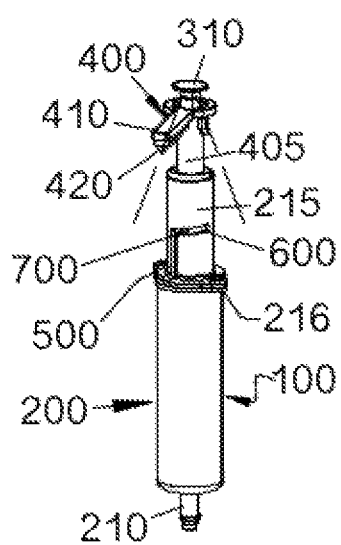
FIG. 4 illustrates the telescopic washing device in a position representing the wiper element rotated approximately one-third (⅓) of a ninety degree (90°) turn to a second path.
Figure 5:
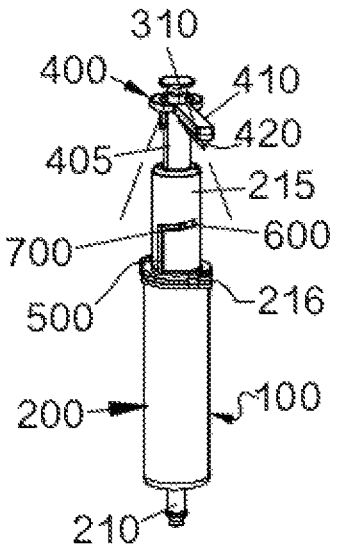
FIG. 5 illustrates the telescopic washing device in a position representing the wiper element rotated approximately two-thirds (⅔) of the ninety degree (90°) turn to the second path.
Figure 6:
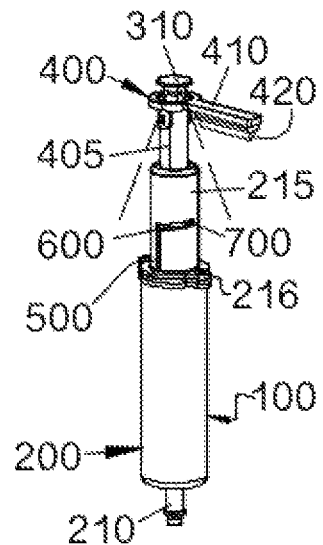
FIG. 6 illustrates the telescopic washing device in a position representing the wiper element rotated approximately three-thirds (3/3) of the ninety degree (90°) turn to the second path.

After that intermediate extended position, the second telescopic member 300 continues moving linearly upwards along or parallel to the longitudinal axis Z, and also pushes through its second end of travel element 320 the wiper element 400. This causes the second telescopic member 300, together with the wiper element 400, to protrude outwards away from the optical surface S to be washed as shown in FIG. 2. Once the second telescopic member 300 and the wiper element 400 have been displaced a suitable distance, the wiper element 400 starts rotating according to the second path as the pin 700 slides along the second guiding area 600. When a given position of the second telescopic member 300 is reached, the washing fluid flows out through the nozzle towards the surface to be washed as shown in FIGS. 2-6. Fluid ejection may occur during the movement of the second telescopic member 300 alone or during the movement of the second telescopic member 300 together with the wiper element 400.

The wiper arm 410 with the wiper blade 420 thus performs a first linear or axial movement outwards from the retracted position along the longitudinal axis Z as the pin 700 slides along the first guiding area 500, and a second radial or rotational, i.e. helical, movement as the pin 700 slides along the second guiding area 600. This allows any the desired surface to be cleaned and dried efficiently from an initial position of the telescopic washing device 100 concealed in the optical surface S.

Discharge of washing fluid may be controlled by a post (not shown) as described in the US patent application US20180021792 of the same applicant or any other technology available. The post is part of the first telescopic member 200 and is configured as a cylinder having through holes and a top pointed tip to facilitate insertion into the second telescopic member 300. The washing fluid is allowed to be discharged via the through holes into the second telescopic member 300. In the retracted position, the post is positioned inside the second telescopic member 300 preventing the washing fluid from flowing therethrough. In the retracted position, a first stroke for the second member 300 is defined along or during which no washing fluid is allowed to be discharged out of the nozzle. In the extended position, the second telescopic member 300 is moved until the post is positioned outside the second telescopic member 300 allowing the washing fluid to flow therethrough. In the extended position, a second stroke for the second telescopic member 300 is defined along or during which the washing fluid is allowed to be discharged out of the telescopic washing device 100. Thus, no fluid is discharged just after the second telescopic member 300 starts moving upwards. When a given distance has been travelled by the second telescopic member 300 and the nozzle is arranged protruding from the wiper element 400, washing fluid starts being discharged from the nozzle. After washing and wiping operations have been completed, the second telescopic member 300 together with the wiper element 400 are caused to move downwards to return back downward in a reverse way to the initial, retracted position of FIG. 1, with the second telescoping member 300 only performing a vertical movement along axis Z. This is carried out by a compression spring 250, shown in FIGS. 7-9, when a pressure from the pressurized fluid is below a predetermined value. The compression wiper spring 450 improves the movement along axis Z.

The discharge of washing fluid as the second telescopic member 300 moves relative to the first telescopic member 200 along or during rotational movement of the wiper element 400 allows a sweeping effect to be provided with the washing fluid being uniformly distributed against the optical surface S. An efficient washing effect is thus accomplished causing dirt to be efficiently removed from the optical surface S. The passage of washing fluid can be precisely varied by varying the height of the post as required.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A telescopic washing device for cleaning a surface (S), the device comprising:
   a first telescopic member adapted for receiving pressurized fluid from a fluid source;
   a second telescopic member arranged to be telescopically moved by the pressurized fluid relative to the first telescopic member according to a first path between a retracted position and an extended position, the first path being linear and parallel to a longitudinal axis Z of the first and second telescopic members;

a wiper element coupled to the second telescopic member such that the wiper element can be moved according to a second path, the second path lying on a plane XY substantially perpendicular to the longitudinal axis Z;

a second guiding area associated with one of the first telescopic member or the wiper element and according to the second path; and a guiding element complementarily associated with the other of the first telescopic member or the wiper element configured to slide relative to the second guiding area as the first and second telescopic members move relative to each other, whereby as pressurized fluid is supplied to the first telescopic member, the wiper element is at least rotated according to the second path.

2. The device of claim 1 further comprising: a first guiding area associated with one of the first telescopic member or the wiper element and substantially extending according to the first path, wherein the second guiding area extends from the first guiding area at an angle (α) thereto, wherein the guiding element is configured to slide relative to the first and second guiding areas, and wherein as pressurized fluid is supplied to the first telescopic member, the wiper element is first moved linearly according to the first path and then at least rotated according to the second path.

3. The device of claim 2, wherein the guiding element is formed in the wiper element and the first and second guiding areas are formed in a guide cover without relative movement with the first telescopic member.

4. The device of claim 3, wherein the first guiding area and the second guiding area are formed extending at least partially through at least the guide cover.

5. The device of claim 2, wherein the angle (α) between the first guiding area and the second guiding area substantially ranges from 90° to 270°.

6. The device of claim 2, wherein the first guiding area and the second guiding area are configured as at least one selected from grooves, recesses or slots and the guiding element is configured as a pin projecting into the grooves, recesses or slots.

7. The device of claim 2, wherein the guiding element is associated with the first telescopic member and the first and second guiding areas are associated with the wiper element.

8. The device of claim 2, wherein the guiding element is associated with the wiper element and the first and second guiding areas are associated with first telescopic member.

9. The device of claim 2, wherein first and second end of travel elements are formed in the second telescopic member for driving the wiper element along the first and second paths.

10. The device of claim 9, wherein the wiper element has a wiper body surrounding the second telescopic member and extending between a first end adapted to abut the second end of travel element and a second end adapted to abut the first end of travel element.

11. The device of claim 10, wherein a stroke (L) of the second telescopic member along the first path corresponds to the sum of a stroke (L1) of the second telescopic member not abutting the wiper element and a stroke (L2) of the second telescoping member driving the wiper element the first and second paths.

12. The device of claim 11, wherein the guiding element is formed in the wiper element and the first and second guiding areas are formed in a guide cover without relative movement with the first telescopic member.

13. The device of claim 12, further comprising a biasing means for returning the second telescopic member back into the retracted position when a pressure from the pressurized fluid is below a predetermined value.

14. The device of claim 1, wherein first and second end of travel elements are formed in the second telescopic member for driving the wiper element along the first and second paths.

15. The device of claim 14, wherein a stroke (L) of the second telescopic member along the first path corresponds to the sum of a stroke (L1) of the second telescopic member not abutting the wiper element and a stroke (L2) of the second telescoping member driving the wiper element the first and second paths.

16. The device of claim 1, wherein the wiper element has a wiper body surrounding the second telescopic member and extending between a first end adapted to abut the second end of travel element and a second end adapted to abut the first end of travel element.

17. The device of claim 1, further comprising: a biasing means for returning the second telescopic member back into the retracted position when a pressure from the pressurized fluid is below a predetermined value.

18. The device of claim 1, wherein the wiper element includes a wiper arm movably coupled to the second telescopic member, and a wiper blade supported by the wiper arm.

19. The device of claim 1, wherein the wiper element is arranged substantially perpendicular to the longitudinal axis Z of the first and second telescopic members.

20. The device of claim 1, wherein at least one nozzle is provided in the second telescopic member.

* * * * *